United States Patent
Berger

(10) Patent No.: US 8,486,273 B2
(45) Date of Patent: Jul. 16, 2013

(54) WATER DEFLECTION SILT COLLECTION SYSTEM

(76) Inventor: John Berger, Philomath, OR (US)

( * ) Notice: Subject to any disclaimer, the term of this patent is extended or adjusted under 35 U.S.C. 154(b) by 312 days.

(21) Appl. No.: 13/071,351

(22) Filed: Mar. 24, 2011

(65) Prior Publication Data

US 2011/0233140 A1 Sep. 29, 2011

Related U.S. Application Data

(60) Provisional application No. 61/318,185, filed on Mar. 26, 2010.

(51) Int. Cl.
*B01D 24/04* (2006.01)
*E02B 3/02* (2006.01)
*E02B 5/08* (2006.01)
*E02B 8/02* (2006.01)

(52) U.S. Cl.
CPC .............. *B01D 24/04* (2013.01); *E02B 3/023* (2013.01); *E02B 5/085* (2013.01); *E02B 8/023* (2013.01)
USPC ............ 210/747.5; 210/162; 210/170.1; 405/43; 405/45; 405/118

(58) Field of Classification Search
USPC ............ 210/747.1, 747.2, 747.3, 747.5, 162, 210/170.01, 170.03, 170.1, 282; 405/36, 405/43, 45, 118, 302.6
See application file for complete search history.

(56) References Cited

U.S. PATENT DOCUMENTS

| | | | |
|---|---|---|---|
| 2,436,630 A * | 2/1948 | Clegg | 210/170.1 |
| 2,442,358 A * | 6/1948 | Harp | 210/170.1 |
| 4,330,222 A * | 5/1982 | Klein | 405/43 |
| 5,100,258 A * | 3/1992 | VanWagoner | 405/45 |
| 5,637,211 A * | 6/1997 | Neff | 210/170.01 |
| 6,042,733 A * | 3/2000 | Tucker | 210/747.5 |
| 6,953,528 B2 * | 10/2005 | Nesfield | 210/747.5 |
| 7,419,333 B2 * | 9/2008 | Bussey et al. | 405/302.6 |
| 7,850,857 B2 * | 12/2010 | Tucker | 210/747.5 |
| 2001/0026731 A1 * | 10/2001 | Fukui | 405/302.6 |
| 2004/0022583 A1 * | 2/2004 | Bussey et al. | 405/43 |
| 2009/0178979 A1 * | 7/2009 | Hastings et al. | 210/747 |

OTHER PUBLICATIONS

Chapter 6: Sediment and Erosion Control Tools, before Mar. 2011, 13 pages.

* cited by examiner

*Primary Examiner* — Christopher Upton
(74) *Attorney, Agent, or Firm* — Chernoff, Vilhauer, McClung & Stenzel LLP

(57) ABSTRACT

A device for removing silt from flowing water by temporarily slowing the water enough to permit silt to settle naturally to the bottom is disclosed. The water may be slowed by a combination of increased depth and obstructions in the form of rough rocks and chain link fencing.

11 Claims, 1 Drawing Sheet

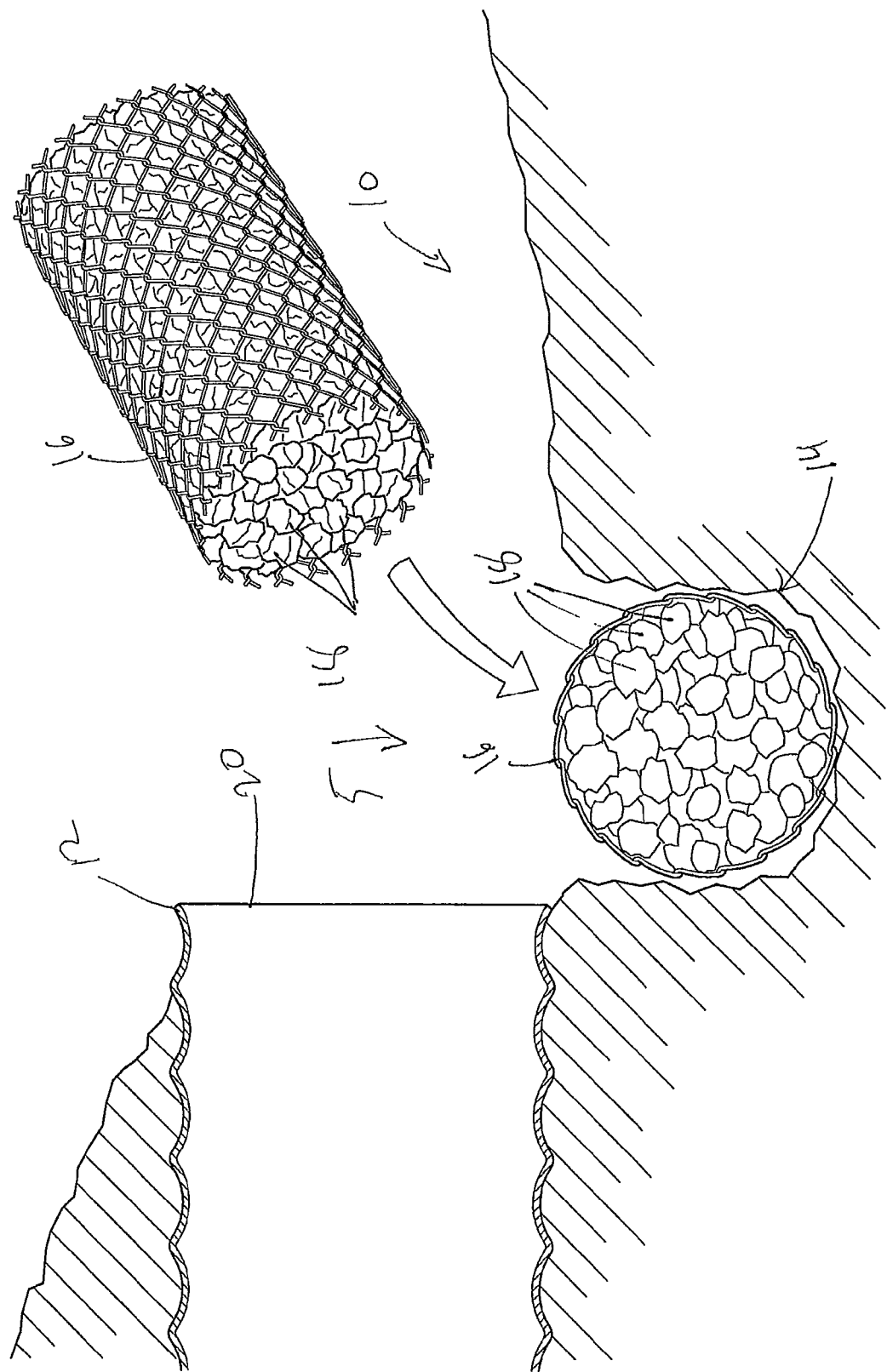

WATER DEFLECTION SILT COLLECTION SYSTEM

CROSS-REFERENCE TO RELATED APPLICATIONS

This application claims the benefit of the filing date of U.S. Provisional Patent Application No. 61/318,185, filed Mar. 26, 2010, the entire disclosure of which is hereby incorporated herein by reference for all purposes.

BACKGROUND

Water flowing through channels such as drainage ditches and streams can become contaminated with silt—fine particles of sediment and organic material—from many sources. This is especially true when the channels are located in places of environmental disturbance, such as along roadways, near construction sites, and in agricultural areas. Such disturbances expose soil to erosion and remove the natural vegetation which tends to slow down water flow. Silt can be harmful to aquatic life, and also tends to accumulate in ways that result in restrictions in the flow of water. This can lead to flooding, and in extreme cases, to roadway washouts or even landslides.

Parties responsible for the maintenance of environmental quality, as well as the safety of rural roads, face a dilemma: permitting the rapid flow of silt-laden water is preferable to avoid damming of water channels and the associated flooding, but on the other hand, healthy fisheries require clean water. Water channel design which limits the transport of silt tends to involve damming, using hay bales, silt fences, and similar structures. These dams slow water flow to permit settling, but results in large deposits of silt which must be laboriously removed from behind the dam. Additionally, dams are problematic during periods of unusually high water flow. At such times it may be preferable to permit a high rate of flow to prevent flooding, while making silt removal a lesser priority. Simple dams cannot accommodate this need, and instead lead to flooding if the dam is sturdy, or to dam failure if it is not, which releases the built up silt.

What is needed, then, is a means of promoting the settling of silt without unduly restricting water flow, and permitting the collected silt to be easily removed to restore the system to full operation.

BRIEF SUMMARY

In order to remove silt from flowing water, a water channel is selectively deepened by the creation of a recessed area below the bottom thereof. The recessed area is lined with a porous wrap, which is then filled with impervious objects. The wrap is then secured around the objects to hold them in place. The resultant trap slows the flow of water and permits some of the silt contained therein to settle to the bottom of the trap. The trap may then be periodically cleaned to maximize efficiency and collect the silt for use elsewhere. Multiple traps may also be employed to increase silt removal in a given water channel.

The foregoing and other objectives, features, and advantages of the invention will be more readily understood upon consideration of the following detailed description of the invention taken in conjunction with the accompanying drawing.

BRIEF DESCRIPTION OF THE DRAWING

The FIGURE depicts one embodiment of the invention, in which one embodiment of a silt collection device is placed at the bottom of a ditch at the mouth of a culvert.

DETAILED DESCRIPTION OF PREFERRED EMBODIMENTS

A "water channel" as used herein may be any place where water tends to flow in a concentrated manner, as opposed to a broad or sheet-like manner. Water channels need not carry water at all times, or even most of the time. The channel may be natural or artificial, and may carry water from natural sources, such as rain, or from artificial sources, such as irrigation, washing of equipment, construction sites, or residential, industrial, or agricultural effluent. Non-limiting examples of water channels include streams, irrigation and drainage ditches, swales, draws, culverts, French, tile, or perforated-pipe drains, and spillways.

A "substantially impervious object" as used herein is any object which absorbs minimal water when immersed in it, but need not be completely waterproof. They may be naturally occurring or artificial. Non-limiting examples include rocks, objects constructed of metal, fiberglass, plastic, or similar materials, and artificial rock-like objects such as bricks. In a preferred embodiment, the substantially impervious object is a rock mined from a quarry.

A "porous wrap" as used herein is any material capable of permitting both water and silt to pass easily through, but simultaneously capable of retaining macroscopic objects in place. No particular size of macroscopic object need be retained by the porous wrap. It may be constructed of any material of sufficient strength to serve its purpose. In a preferred embodiment, the porous wrap is a segment of chain link fencing.

"Diameter" as used herein refers to the largest diameter of a hypothetical sphere capable of fitting within the exterior contours of an object. Thus, an irregularly shaped object may have a "diameter" even though it is not itself round. It is not necessary that the object actually be hollow or capable of receiving a tangible sphere. Additionally, to the extent that an object may be somewhat concave, it is permissible in assessing the diameter to permit the hypothetical sphere to extend into the concavity somewhat, provided it does not extend beyond a surface drawn across the concavity from the high points surrounding it.

"Silt" as used herein refers to material capable of suspension in water having a diameter of approximately 0.08 mm or less.

The FIGURE depicts one embodiment of a silt collection device in the form of a trap 5. A water channel, which in the drawing is a ditch 10 fed by a culvert 12, has a small recessed area 14 dug across it at the mouth 20 of the culvert 12. This recessed area 14 may be preferably dug with a vacuum truck, which is able to rapidly pull the soil from a narrow area without disturbing surrounding soil or vegetation. However, ordinary shovels, backhoes, or any other method may also be used. The recessed area 14 is then lined with a porous wrap 16 which permits water to flow freely through it. The preferred porous wrap 16 is chain link fencing, although other types of mesh, including wire mesh, can be used. The efficacy of silt collection depends on slowing the flow of water, and the interlocking, twisting wire of this material, as well as the rough galvanized surface, is effective at dissipating energy. Other materials may also be used, however, provided that they permit the free flow of water and have sufficient strength.

Once the porous wrap 16 is in place, substantially impervious objects 18 are placed within it, and the porous wrap 16 is secured so as to hold the impervious objects 18 together and in place. Preferred impervious objects 18 are simply rocks fresh from a quarry. As with the wrap, the rough and jagged nature of such rocks helps to dissipate the energy of flowing water and permit silt to settle to the bottom. Rocks are also heavy enough to resist even high flows of water. Other materials may also be used provided they have the same properties of high density and effective slowing of water. Preferably, the rocks have a diameter of approximately 4-6 inches. Smaller rocks and gravel are hard to retain in a porous wrap, are subject to wash out during high flows, and also tend to pack more closely than is desired, causing water to simply flow over them. Larger rocks do not slow the flow of water as much because of a relatively small surface area compared to their volume. However, different sizes may find applications in different locations and flow conditions.

When water flows into the trap 5, the increased depth of the water channel in that location, combined with the frictional effects of the materials placed in the recessed area, slows the water enough to allow some silt to settle out. A single trap 5 will not remove all the silt in the flow, but a series of traps 5, each removing some fraction of it, can prove very effective even in highly contaminated water.

As silt collects in the trap 5, it becomes less effective because the depth of the trap 5 is reduced, and because the tendency of silt already in the trap 5 to wash out and into the water is increased. The trap 5 should therefore be cleaned periodically. A vacuum truck and source of water is most effective for this purpose. The vacuum hose from the truck may be deployed above the trap to pull sediments out of it. At the same time, water may be sprayed over the trap to dislodge sediments that are clinging to the surface of the rocks or lodged too deep for the vacuum to reach them by itself.

Silt collected from traps 5 must be disposed of in some way. Because it is a source of nutrients useful to plant life, it is preferable that it be used as a mulch or topsoil, rather than being discarded like trash. However, this disposal should be accomplished at a substantial distance from running water, or the silt that is collected will simply run into nearby water channels at the next rain. Additionally, it is preferable to spread it on a relatively level section of ground to minimize erosion. The silt so spread may be seeded to encourage the growth of plants, which will further limit the tendency of the silt to erode. Seeding also allows a land manager to choose the type of plants which benefit from the silt. For instance, wildlife habitat can be enhanced by sowing browse or mast to feed and attract game, or alternatively appropriate grazing grasses may be sowed for the purpose of feeding livestock.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

I claim:

1. A silt collection device for a water channel, comprising:
   (a) a recessed area below a bottom of said water channel;
   (b) a plurality of substantially impermeable objects in said recessed area;
   (c) a porous wrap surrounding said substantially impermeable objects.

2. The silt collection device of claim 1 wherein the substantially impermeable objects are rocks.

3. The silt collection device of claim 1 wherein the porous wrap is a wire mesh.

4. The silt collection device of claim 3 wherein the wire mesh is chain link fencing.

5. The silt collection device of claim 1 wherein the substantially impermeable objects have a diameter of approximately 4 to 6 inches.

6. The silt collection device of claim 1 comprising a plurality of said recessed areas containing substantially impervious objects surrounded by porous wraps.

7. A method of removing silt from water in a water channel, comprising the steps of:
   (a) Excavating a recessed area in a bottom of said water channel;
   (b) Lining said recessed area with a porous wrap;
   (c) Placing a plurality of substantially impervious objects in said recessed area;
   (d) Securing said porous wrap such that said substantially impervious objects are surrounded by and contained within said porous wrap; and
   (e) periodically removing collected silt from said recessed area.

8. The method of claim 7 wherein said excavation is accomplished by a vacuum truck.

9. The method of claim 7 wherein said removal of collected silt is accomplished by a vacuum truck.

10. The method of claim 7 further comprising the step of disposing of said silt by discharging it onto land a substantial distance from said water channel.

11. The method of claim 10 further comprising the step of sowing plants in the land where said silt is discharged.

* * * * *